United States Patent [19]

Vanderburg

[11] Patent Number: 4,527,770

[45] Date of Patent: Jul. 9, 1985

[54] IN-SERVICE TEST VALVE

[75] Inventor: Ralph W. Vanderburg, Longview, Tex.

[73] Assignee: Axelson, Inc., Longview, Tex.

[21] Appl. No.: 628,639

[22] Filed: Jul. 6, 1984

Related U.S. Application Data

[62] Division of Ser. No. 407,336, Aug. 12, 1982, Pat. No. 4,480,653.

[51] Int. Cl.³ .................................................. F16K 31/363
[52] U.S. Cl. ..................................... 251/26; 73/4 R; 137/492
[58] Field of Search .................. 73/4 R, 168; 251/26; 137/492, 112

[56] References Cited

U.S. PATENT DOCUMENTS

| | | | |
|---|---|---|---|
| 1,849,702 | 3/1932 | Bard | 137/113 |
| 3,034,527 | 5/1962 | Hennells | 137/102 |
| 3,664,362 | 5/1972 | Weise | 137/492 X |
| 4,402,341 | 9/1983 | Reip | 137/489 |

OTHER PUBLICATIONS

*Pilot Operated Pressure Relief Valve*, Brochure, Axelson, Inc.

Primary Examiner—Martin P. Schwadron
Assistant Examiner—Stephen M. Hepperle
Attorney, Agent, or Firm—Hubbard, Thurman, Turner & Tucker

[57] ABSTRACT

Disclosed is an in-service test valve and system. The in-service test valve includes a body having a first chamber with a relatively small diameter bore and second chamber axially spaced apart from the first chamber and having a relatively large diameter bore. An imperforate shuttle is slidingly mounted in the valve body and includes a first piston slidingly sealingly mounted in the first chamber bore and a second piston slidingly sealingly mounted in the second chamber bore. An in-service inlet is provided in the valve body for introducing in-service pressure into the first chamber to apply sensing pressure to the first piston and urge the shuttle toward the second chamber. A test inlet is provided for introducing test pressure into the second chamber to apply test pressure to the second piston to urge the shuttle in the direction of the first chamber. A check valve is provided in the valve body for allowing communication of test pressure to the first chamber when test pressure is greater than first chamber pressure. A valve operated by the shuttle is provided for isolating the in-service inlet from the first chamber when test pressure is applied. An outlet is provided in the valve body for communicating pressure within the first chamber exterior of the valve.

7 Claims, 3 Drawing Figures

IN-SERVICE TEST VALVE

This application is a division of application Ser. No. 407,336, filed Aug. 12, 1982, now U.S. Pat. No. 4,480,653.

BACKGROUND OF THE INVENTION

A. Field of the Invention

The present invention relates generally to test valves, and more particularly to a valve for use in the system having a source of in-service pressure and a source of test pressure wherein the valve is shiftable automatically responsive to test pressure between an in-service position and a test position that maintains separation of in-service and test pressures and shifts automatically to the in-service position when test pressure is relieved.

B. Description of the Prior Art

There have been developed a number of systems for monitoring and protecting flow lines and pressure vessels. These systems include high-low systems, as for example the system described in U.S. Pat. No. 3,043,331, which are adapted to maintain flow through a flow line when the pressure within the line lies within a preselected range of pressures and close the line when the line pressure falls outside the selected range. These systems also include safety-relief systems which are adapted to vent protected flow lines or pressure vessels when the pressure exceeds a certain maximum. Examples of safety-relief valves are disclosed in Axelson, Inc. brochure AD64-233, March 1982, entitled "Pilot Operated Pressure Relief Valve", which generally include a relief valve which includes a dome and a valve element. The valve element has an effective area that is smaller than the effective area of the dome. Both the dome and the valve element are exposed to in-service pressure, which maintains the relief valve in a closed position. A control system is provided which is adapted to supply in-service pressure to the dome when the in-service pressure is less than the maximum. However, when in-service pressure exceeds the maximum, the control system is adapted to block in-service pressure and bleed the dome, thereby allowing the relief valve to open.

When it is necessary to set or test a pressure control in a safety-relief system, the in-service pressure must be disconnected from the control and a separate variable source of test pressure connected. Most commonly, testing is achieved by the use of two manually operated valves: an inlet valve to isolate in-service pressure from the control; and a test valve to connect test pressure with the control. The primary shortcoming of the two valve manual system is in the possible isolation of the control from the in-service pressure following testing, as would occur if the operator failed to reopen the inlet valve following a test. Such isolation would make the safety-relief system inoperative. A secondary, but important, shortcoming is in the accidental opening of the test valve prior to closing the inlet valve, which could result in venting in-service pressure to the atmosphere. A further shortcoming of prior test systems is that it may be desirable to test the operation of the control without opening the relief valve. In prior systems, whenever the control shifts to the block and bleed position, the relief valve opens.

There have been attempts to provide a test valve which eliminates the two valve manual system. For example, in U.S. Pat. No. 3,817,282, there is disclosed an in line test valve which includes a plunger element that is in a normally open position to allow the flow of line pressure to the sensors or control. The plunger includes a test pressure passage that is normally closed by an internal check valve. When it is desired to apply test pressure to the sensors, an operator or stinger is manually inserted into the valve to move the plunger valve element to seat and isolate the sensors or control from line pressure. The stinger additionally mechanically opens the check valve to allow the flow of test pressure to the sensors or control. The valve of the U.S. Pat. No. 3,817,282 does not entirely overcome the shortcomings of the two valve manual system. First, the valve of the U.S. Pat. No. 3,817,282 does not return automatically to the in-service position after test pressure is removed. Rather, the valve remains in the test mode with the sensors or control isolated from in-service pressure until the stinger is removed. Additionally, as the stinger operates the plunger valve element between the closed test position and the fully open in-service position, the check valve remains open, thereby allowing communication between the line pressure and the test pressure.

Another stinger operated test valve is disclosed in disclosed in U.S. Pat. No. 3,987,817. In the valve of the U.S. Pat. No. 3,987,817, the check valve is eliminated, but the valve still remains in the test position until the stinger is removed. Likewise, during operation between the closed test position and the fully opened in-service position, the valve allows communication between line pressure and test pressure.

Accordingly, it is an object of the present invention to provide a test valve that will shift back and forth between the in-service and test positions without a mechanical operator. It is a further object of the present invention to provide a test valve that is operable to shift between the in-service and test conditions responsive to test pressure. It is a further object of the present invention to provide a test valve that will shift automatically from the test position to the in-service position when test pressure is removed. It is a further object of the present invention to provide a test system that automatically isolates the relief valve actuator from the control during testing but, which automatically reestablishes control after testing.

SUMMARY OF THE INVENTION

Briefly stated, the foregoing and other objects are accomplished by the valve and system of the present invention. The valve includes a valve body having a pair of axially spaced apart chambers, each having a tubular bore. One chamber is of relatively small diameter and includes an in-service inlet for the receipt of in-service pressure and a test valve outlet. The other chamber is of relatively large diameter and includes a test inlet for the receipt of test pressure.

A shuttle is reciprocatingly mounted in the valve body and includes a small piston which is adapted to operate within the small chamber and a large piston which is adapted to operate within the large chamber. Sliding seals are provided between the respective bores and pistons. Thus, in-service pressure within the small chamber acts on the small piston to urge the shuttle toward the large chamber, which shall be referred to as the in-service position. Conversely, test pressure within the large chamber acts on the large piston to urge the shuttle toward the small chamber, which shall be referred to as the test position. Because of the size differential between the pistons, a relatively small test pressure will overcome a relatively large in-service pressure to drive the shuttle to the test position.

The end of the small piston is formed to define a valve element, which cooperates with a seat formed in the small chamber when the shuttle is in the test position to isolate the small chamber from the in-service inlet, thereby to isolate the test valve outlet from the in-service inlet. A check valve is provided for allowing flow from the test inlet to the small chamber, but preventing flow from the small chamber to the test inlet. When the shuttle shifts initially to the test position, small chamber pressure is larger than test pressure and the check valve remains closed. When test pressure is increased to exceed small chamber pressure, the check valve opens to communicate test pressure with the test valve outlet. When test pressure is relieved the check valve closes, thereby to isolate in-service pressure from test pressure.

In the system of the present invention, a pair of test valves of the present invention are provided. The first test valve is connected in the system such that the test valve outlet is connected to the sensor of the relief valve control sensor. The other test valve is connected in the system such that the test valve outlet is connected to the safety-relief valve dome. The in-service inlet of the first test valve is connected to line pressure and the in-service inlet of the second test valve is connected to the control sensor. The test pressure inlets of both test valves are connected in parallel to test pressure. When test pressure is applied to the system, both test valves shift substantially simultaneously to the test position, wherein the control sensor is isolated from in-service pressure and the safety-relief valve dome is isolated from the control. When test pressure reaches the set point of the control, the control shifts to the block and bleed position; however, the second test valve prevents the shifting of the control sensor from bleeding the safety-relief valve actuator.

DESCRIPTION OF THE PREFERRED EMBODIMENT

Figure 1:
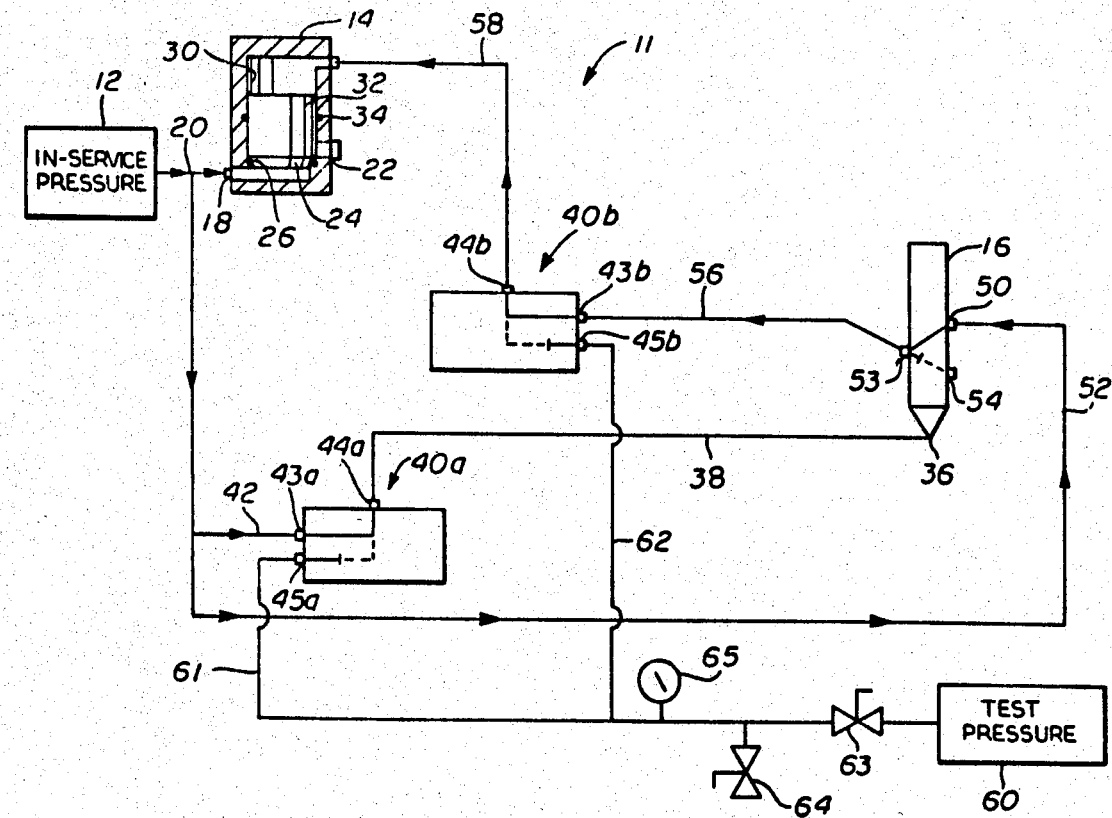
FIG. 1 is a schematic view of the safety-relief system of the present invention.

Referring now to the drawings, and first to FIG. 1, the safety-relief system of the present invention is designated generally by the numeral 11. Safety-relief system 11 is adapted to protect from overpressuring a source of in-service pressure 12, which may be a pressure vessel or a flow line. Safety-relief system 11 includes a safety-relief valve 14 and a control sensor 16. Safety-relief valve 14 includes an inlet 18 which receives in-service pressure from in-service pressure source 12 through a conduit 20, and an outlet 22, which vents safety-relief valve 14. Safety-relief valve 14 includes a piston valve element 24 which cooperates with a seat 26 to isolate inlet 18 from outlet 22.

Valve element 24 is operated by in-service pressure acting by a piston 32 slidingly sealingly mounted in a dome 30. Piston 32 is rigidly interconnected with valve element 24.

Valve element 24 and seat 26 cooperate to define an effective area which is less than the effective area defined by piston 32 and dome seal 34. Thus, if the respective effective areas of valve element 24 and piston 32 are exposed to equal pressure, valve element 24 will be held in the closed position, as shown in FIG. 1. However, if the pressure in dome 30 is relieved, then in-service pressure acting on valve element 24 will drive safety-relief valve 14 to the open position, thereby venting in-service pressure through outlet 22.

Control sensor 16 is adapted to sense in-service pressure and communicate in-service pressure to dome 30 when in-service pressure is less than a predetermined maximum, but block and bleed pressure from dome 30 when in-service pressure exceeds the predetermined maximum. Examples of controls and safety-relief valves are disclosed in Axelson, Inc. brochure AD64-233, entitled "Pilot Operated Pressure Relief Valve", published March, 1982.

Control sensor 16 includes a sensor inlet 36, which receives in-service pressure through a conduit 38. In-service pressure is communicated to conduit 38 through a first in-service test valve, designated generally by the numeral 40a, which receives in-service pressure through a conduit 42.

Control sensor 16 also includes an in-service inlet 50, which receives in-service pressure through a conduit 52. Control sensor 16 also includes a control port 53 and a bleed port 54. Control port 53 is connected to dome 30 by a pair of conduits 56 and 58 which are connected through a second in-service test valve 40b.

Control sensor 16 is a two position valve in which a first position, as shown in FIG. 1, communicates in-service inlet 50 with a control port 53, but which blocks communication between control port 53 and bleed port 54. Thus, in the first position, in-service pressure is communicated to dome 30 of safety-relief valve 14. In the second position, control sensor 16 blocks communication between control inlet 50 and control port 53, but allows communication between control port 53 and bleed port 54. Thus, in the second position, control 16 bleeds dome 30 and allows safety-relief valve 14 to open. The operation of control sensor 16 between the first and second positions is responsive to in-service pressure received at control sensor inlet 36.

In-service test valves 40a and 40b are substantially identical and each includes an in-service inlet, which for first in-service test valve 40a is designated 43a and for second in-service test valve 40b is designated 43b, and a test valve outlet, which for first in-service test valve 40a is designated 44a and for second in-service test valve 40b is designated 44b.

In FIG. 1, both in-service test valves 44a and 44b are in the in-service position, wherein in-service pressure is communicated through the test valve, as for example between in-service inlet 43a and test valve outlet 44a of first in-service test valve 40a. Each in-service test valve 40a and 40b also includes a test inlet, which for first in-service test valve 40a is designated 45a and for second in-service test valve 40b is designated 45b. In the in-service position, communication between, for example, test inlet 45a and test valve outlet 44a of first in-service test valve 40a is blocked. However, each test valve 40a and 40b is adapted, as will be described in detail hereinafter, to shift to a test position, wherein communication between, for example, in-service inlet 43a and test valve outlet 44a of first in-service test valve 40a is blocked and communication between test inlet 45a and test valve outlet 44a is established.

In order to test control sensor 16, a test pressure source 60 is provided. Test pressure source 60 is connected to test inlet 45a of first in-service test valve 40a by a conduit 61 and to test inlet 45b of second in-service test valve 40b by a conduit 62. A valve 63 is provided for isolating test pressure source 60 from conduits 61 and 62 and a valve 64 is provided for bleeding test pressure from conduits 61 and 62.

When it is desired to test safety-relief system 11, valve 63 is opened to admit test pressure to conduits 61 and 62. As will be described in detail hereinafter, in-service test valves 40a and 40b substantially simultaneously shift to the test position thereby isolating both sensor inlet 36 of control sensor 16 and dome 30 of safety-relief valve 14 from in-service pressure. Test pressure may then be increased to test or set the operation of control sensor 16. Because second in-service test valve isolates dome 30 of safety-relief valve 14 from in-service pressure, the operation of control sensor 16 will not cause safety-relief valve 14 to open. If, however, it is desired to test the operation of safety-relief valve 14, second in-service test valve 40b may be omitted, as for example, by disconnecting or otherwise blocking the flow of test pressure to test inlet 45b. When testing is complete, valve 63 is closed and bleed valve 64 is opened, thereby to return test valves 40a and 40b automatically to the in-service position. A gauge 65 is provided for monitoring test pressure.

Figure 2:
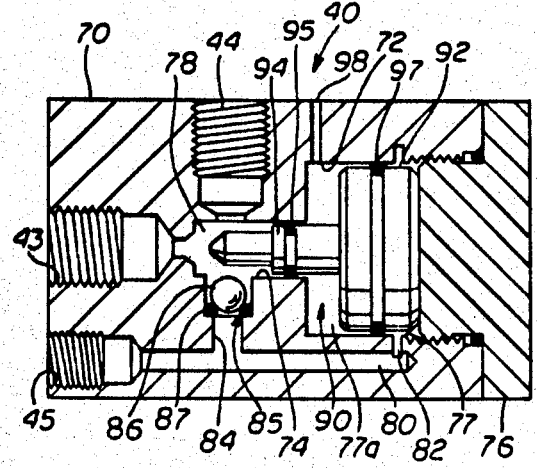
FIG. 2 is a sectional view of the in-service test valve of the present invention in the in-service position.

Referring now to FIG. 2, the preferred embodiment of the in-service test valve of the present invention is designated generally by the numeral 40 and is shown in the in-service position. In-service test valve 40 includes a valve body 70 which includes a relatively large diameter tubular bore 72 and a relatively small diameter tubular bore 74. An end piece 76 is connected to valve body 70 at the end of large diameter tubular bore 72 to define a chamber 77. Valve body 70 has formed therein at the end opposite end piece 76 in-service inlet 43, which is adapted to receive in-service pressure in the manner described above. In-service pressure received through in-service inlet 43 is supplied to bore 74, which defines generally a chamber 78.

Valve body 70 has formed therein test valve outlet 44, which is adapted to supply pressure to control sensor 16 or dome 30 in the manner described with respect to FIG. 1. Test valve outlet 44 is arranged to communicate with and receive pressure from chamber 78.

Valve body 70 also has formed therein test inlet 45, which is adapted to receive test pressure. Test inlet 45 is connected to a passageway 80 formed in valve body 70. Passageway 80 communicates through a radially enlarged portion 82 of bore 72 to communicate test pressure to chamber 77. Passageway 80 also communicates through a tubular port 84 formed in valve body 70 with chamber 78. Tubular port 84 is formed to define a check valve 85 which includes a ball valve element 86 and a seat 87. Check valve 85 is arranged to allow flow from passageway 80 to chamber 78, but prevent flow from chamber 78 to passageway 80.

In-service test valve 40 has reciprocatingly mounted therein an imperforate shuttle designated generally by the numeral 90. Shuttle 90 includes a large diameter piston 92 disposed in chamber 77 in sliding relationship with large tubular bore 72 and a small diameter piston 94 disposed in chamber 78 in sliding relationship with bore 74.

In the in-service condition, as depicted in FIG. 2, in-service pressure is supplied to chamber 78 through in-service inlet 43. The in-service pressure acts on small piston 94, which is sealed within bore 74 by a seal 95, to urge shuttle 90 in the direction toward large chamber 77. Large piston 92 is provided with a seal 97 which cooperates with bore 72. Test pressure supplied to in-service test valve 40 through test inlet 45 acts on the area of large piston 72 sealed by seal 97 to urge shuttle 90 in the direction toward small chamber 78. A vent port 98 is provided for maintaining the portion of large chamber 77a between seals 95 and 97 at substantially atmospheric pressure. In the in-service condition, test pressure is substantially equal to atmospheric and, therefore, there is substantially no force tending to urge shuttle 90 in the direction toward small chamber 78. Thus, during in-service operation, in-service pressure maintains in-service test valve 40 in the in-service position, as shown in FIG. 2. Additionally, in-service pressure within small chamber 78 maintains check valve 85 in the closed position, thereby isolating test inlet 45 from in-service pressure.

When it is desired to test the system, test pressure is provided to large chamber 77 through test inlet 45. The area of large piston 92 is chosen to be several times larger than that of small piston 94, and in the preferred embodiment, the area of large piston 92 is approximately ten times that of small piston 94. Thus, a relatively small test pressure is sufficient to override a relatively large in-service pressure to drive shuttle 90 to the test position, as shown in FIG. 3.

Figure 3:
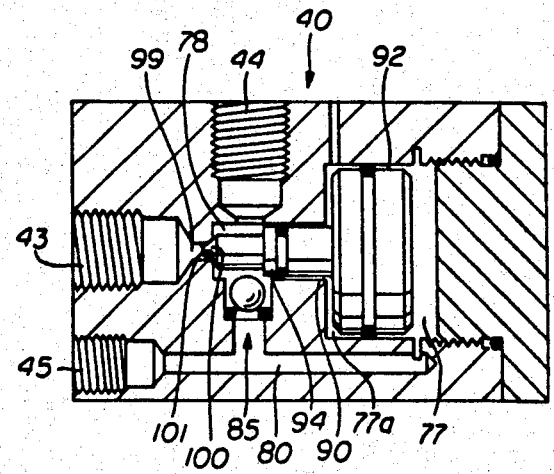
FIG. 3 is a sectional view of the in-service test valve of the present invention in the test position.

Referring now particularly to FIG. 3, in-service test valve 40 includes an in-service inlet seal 99. In-service inlet seal 99 is formed by the end of small piston 94, which defines a valve element 100, and a seat 101, which is formed in valve body 70. When test pressure is applied to large chamber 77 through test inlet 45 thereby to act on large piston 92 to drive shuttle 90 to the test position, in-service inlet seal 99 operates to isolate small chamber 78 from in-service inlet 43. However, upon initial shifting of shuttle 90 to the test position, test pressure is substantially less than in-service pressure, which is in effect trapped in small chamber 78. Thus, the pressure within chamber 78 is greater than that within passageway 80 and, initially, check valve 85 remains closed. When test pressure is increased to exceed the pressure trapped within small chamber 78, check valve 85 opens thereby to allow communication between test inlet 45 and test valve outlet 44, which thereby allows the application of test pressure to control 16 and actuator 28. When test pressure is relieved, check valve 85 closes to isolate in-service inlet 43 from test inlet 45, and in-service pressure drives shuttle 90 back to the in-service position.

From the foregoing it will be seen that this invention is one well adapted to attain all of the ends and objects hereinabove set forth together with other advantages which are obvious and which are inherent to the apparatus.

It will be understood that certain features and subcombinations are of utility and may be employed with reference to other features and subcombinations. This is contemplated by and is within the scope of the claims.

As many possible embodiments may be made of the invention without departing from the scope thereof it is to be understood that all matters herein set forth are shown in the accompanying drawings as to be interpreted as illustrative and not in a limiting sense.

What is claimed is:

1. A safety-relief system for monitoring a source having an in-service pressure and relieving said source when said in-service pressure exceeds a predetermined maximum, which comprises:

a relief valve including a valve element having an effective area arranged to be acted on by said in-service pressure, said valve element being operated by a dome piston positioned in a dome and having an effective area larger than the effective area of said valve element;

means for supplying in-service pressure to said dome to act on said dome piston;

a control sensor including means for sensing in-service pressure and communicating in-service pressure to said dome when in-service pressure is less than said preselected maximum and venting said dome when in-service is greater than said preselected maximum;

first test valve means for isolating said control sensor sensing means from in-service pressure and applying a test pressure to said control sensor sensing means, said first test valve means being operated by said test pressure;

and second test pressure operated test valve means for isolating said dome from said control sensor and applying said test pressure to said dome, whereby the application of said test pressure to said control sensor does not result in the opening of said relief valve, wherein each of said first and second test valve means includes:

a valve body having axially spaced apart interconnected first and second chambers, each of said chambers having a respective bore, said second chamber bore having a larger diameter than said first bore, said valve body including an in-service inlet and outlet communicating with said first chamber and a test inlet communicating with said second chamber;

a shuttle mounted in said valve body and including a first piston slidingly sealingly mounted in said first cylinder and a second piston sealingly mounted in said second chamber;

first valve means operated by said shuttle for blocking said in-service inlet when test pressure is applied to said test inlet;

and second valve means for communicating test pressure to said first after said first valve means block said in-service inlet.

2. The safety-relief system as claimed in claim 1, wherein said second valve means includes check valve means for opening to communicate said test pressure with said first chamber when test pressure is greater than the pressure in said first chamber.

3. The safety-relief system as claimed in claim 1, wherein said second valve means includes a passageway formed in said valve body connecting said test inlet with said first chamber, and a check valve in said passageway arranged to allow flow from said test inlet to said first chamber and block flow from said first chamber to said test inlet.

4. A safety-relief system for monitoring a source having an in-service pressure and relieving said source when said in-service pressure exceeds a predetermined maximum, which comprises:

a relief valve including a valve element having an effective area arranged to be acted on by said in-service pressure, said valve element being operated by a dome piston positioned in a dome and having an effective area larger than the effective area of said valve element;

a control sensor including a sensor inlet, an in-service inlet, a control port, and a vent port, said control port being connected to said dome, said control sensor being adapted to receive in-service pressure at said sensor inlet and normally to supply in-service pressure from said in-service inlet to said control port, and said control sensor being adapted, when the pressure at said sensor inlet exceeds said predetermined maximum, to communicate said control port with said vent port and block said in-service inlet, thereby causing said relief valve to open;

a first test valve having an in-service inlet connected to receive in-service pressure, an outlet connected to said sensor inlet of said control sensor, and a test inlet connected to a test pressure source, said first test valve normally supplying in-service pressure from said first test valve in-service inlet to said first test valve outlet, and said first test valve being operated by test pressure to block said first test valve in-service inlet and supply test pressure to said first test valve outlet;

and a second test valve having an in-service inlet connected to receive in-service pressure from said control port of said control sensor, an outlet connected to said dome, and a test inlet connected to said test pressure source, said second test valve normally supplying in-service pressure from said second test valve in-service inlet to said second test valve outlet, and said second test valve being operated by test pressure to block said second test valve in-service inlet and supply test pressure to said second test valve outlet.

5. The safety-relief system as claimed in claim 4, wherein each of said first and second test valves includes:

a valve body having axially spaced apart interconnected first and second chambers, each of said chambers having a respective bore, said second chamber bore having a larger diameter than said first bore, said in-service inlet and said outlet communicating with said first chamber and said test inlet communicating with said second chamber;

a shuttle mounted in said valve body and including a first piston slidingly sealingly mounted in said first cylinder and a second piston slidingly sealingly mounted in said second chamber;

first valve means operated by said shuttle for blocking said in-service inlet when test pressure is applied to said test inlet;

and second valve means for communicating test pressure to said first chamber after said first valve means blocks said in-service inlet.

6. The safety-relief system as claimed in claim 5, wherein said second valve means includes check valve means for opening to communicate said test pressure with said first chamber when test pressure is greater than the pressure in said first chamber.

7. The safety-relief system as claimed in claim 5, wherein said second valve means includes a passageway formed in said valve body connecting said test inlet with said first chamber, and a check valve in said passageway arranged to allow flow from said test inlet to said first chamber and block flow from said first chamber to said test inlet.

* * * * *